United States Patent
Peterson

(12) 
(10) Patent No.: US 6,582,848 B2
(45) Date of Patent: Jun. 24, 2003

(54) END CAPS FOR SOLDERLESS BATTERY PACK

(76) Inventor: Roland K. Peterson, 14550-20th Ave. NE., Seattle, WA (US) 98155

( * ) Notice: Subject to any disclaimer, the term of this patent is extended or adjusted under 35 U.S.C. 154(b) by 0 days.

(21) Appl. No.: 09/978,950

(22) Filed: Oct. 16, 2001

(65) Prior Publication Data

US 2002/0025473 A1 Feb. 28, 2002

Related U.S. Application Data

(60) Division of application No. 09/332,765, filed on Jun. 14, 1999, now Pat. No. 6,303,248, which is a continuation-in-part of application No. 09/095,776, filed on Jun. 10, 1998, now Pat. No. 6,187,470.
(60) Provisional application No. 60/049,413, filed on Jun. 10, 1997.

(51) Int. Cl.[7] .............................. H01M 2/02; H01M 2/10
(52) U.S. Cl. ...................... 429/99; 429/100; 429/157; 429/159; 429/177
(58) Field of Search ......................... 429/99, 177, 100, 429/157, 159

(56) References Cited

U.S. PATENT DOCUMENTS

| | | | |
|---|---|---|---|
| 1,592,678 A | 7/1926 | Tannert | |
| 3,000,999 A | 9/1961 | Schlau | 136/173 |
| 3,941,618 A | 3/1976 | Mabuchi | 136/173 |
| 4,205,121 A | 5/1980 | Naitoh | 429/99 |
| 4,464,445 A | 8/1984 | Matti | 429/99 |
| 4,554,221 A | 11/1985 | Schmid | 429/1 |
| 4,576,880 A | 3/1986 | Verdier et al. | 429/99 |
| 4,965,148 A | 10/1990 | Daio et al. | 429/159 |
| 5,104,754 A | 4/1992 | Dorinski et al. | 429/99 |
| 5,180,644 A | 1/1993 | Bresin et al. | 429/98 |
| 5,191,275 A | 3/1993 | Singhal | 320/2 |
| 5,250,371 A | 10/1993 | Kleinert, III et al. | 429/99 |
| 5,296,314 A | 3/1994 | Millauer et al. | 429/99 |
| 5,326,651 A | 7/1994 | Mehta et al. | 429/96 |
| 5,489,486 A | 2/1996 | Glover | 429/100 |
| 5,709,963 A | 1/1998 | Sim | 492/99 |
| 6,071,639 A | * 6/2000 | Bryant et al. | 429/99 X |
| 6,218,042 B1 | * 4/2001 | Naudet et al. | 429/99 X |

OTHER PUBLICATIONS

Article, Model Electronics Corp. "Solderless Power Tube", by Jim Petro, S & E Modeler Sailplane & Electric. Oct./Nov., 1998, vol. 3, No. 6, pp. 4–6.

* cited by examiner

*Primary Examiner*—John S. Maples

(57) ABSTRACT

End caps for a battery pack. The end caps have opposing flanges for securing therebetween batteries. At the lateral edges of the flanges, a space is provided for at least a portion of a battery being secured in the pack to protrude outwardly, so that the battery pack is secured without extra width for the end caps. The end caps are compressively engaged to make electrical connection with the terminals of the uppermost and the lowermost batteries. A strapping tape is utilized for wrapping the battery pack around a longitudinal exist to tightly compress batteries between the end caps. The tape is covered by and further compressed with a tightly compressing shrink wrap material.

18 Claims, 13 Drawing Sheets

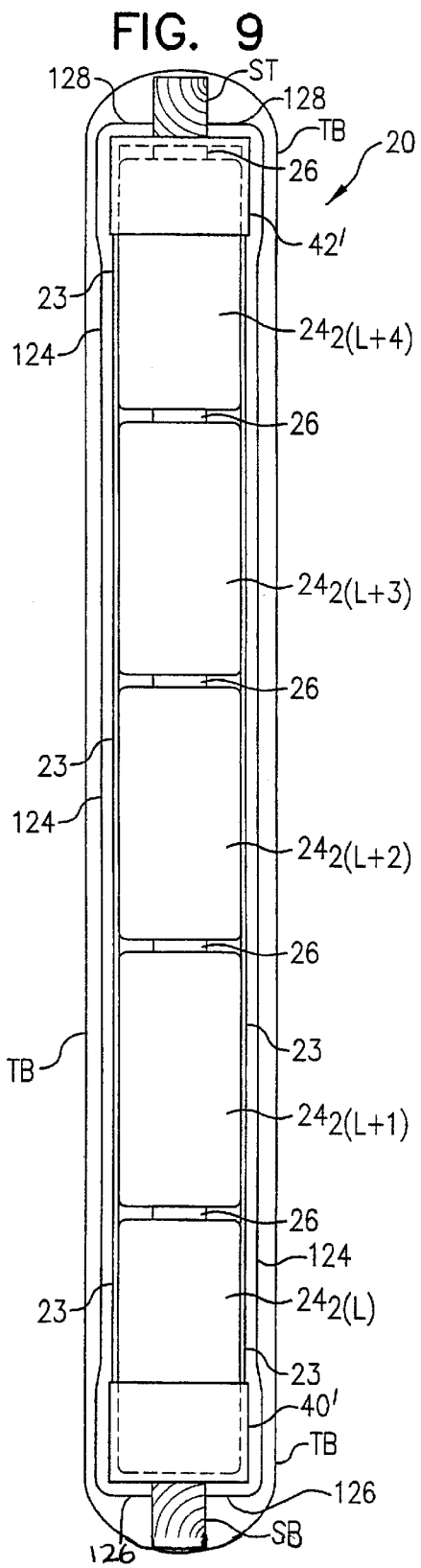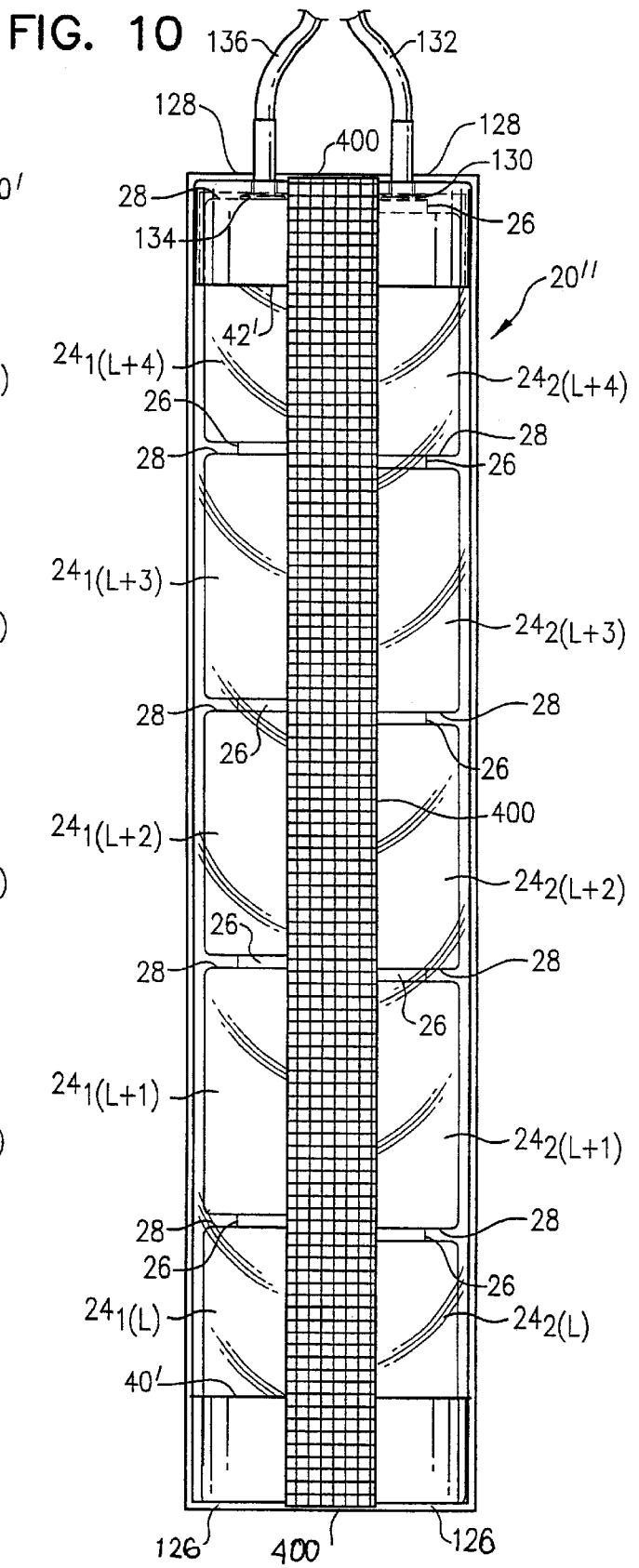

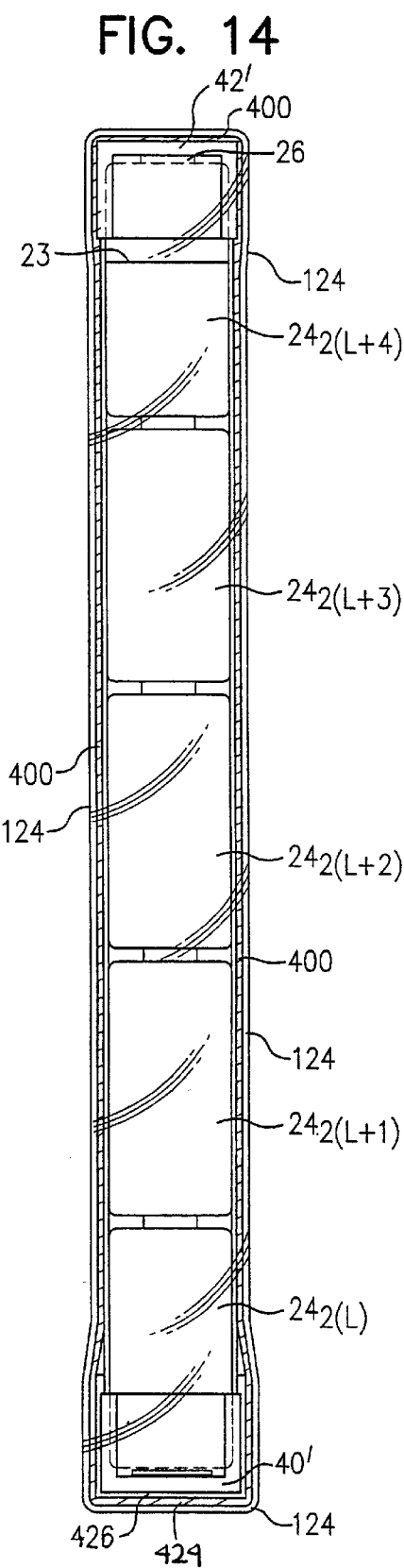
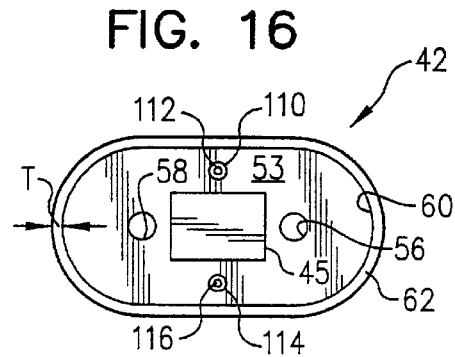
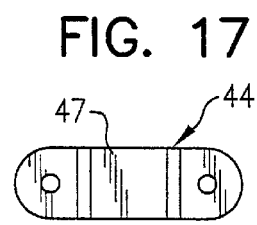
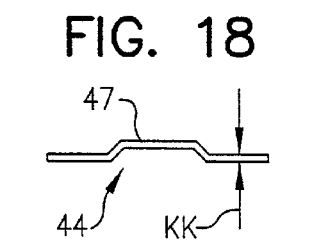
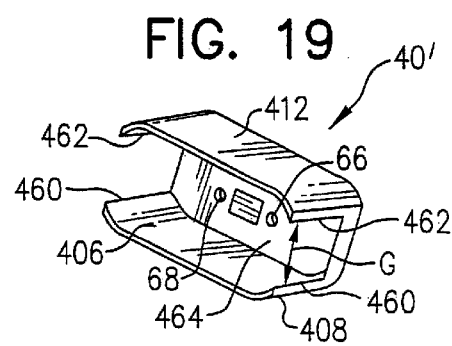
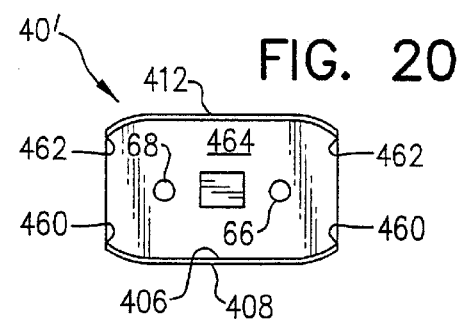

END CAPS FOR SOLDERLESS BATTERY PACK

This application is a divisional of U.S. Ser. No. 09/332,765, filed Jun. 14, 1999, now U.S. Pat. No. 6,303,248, which is a continuation-in-part of U.S. patent application Ser. No. 09/095,776, filed Jun. 10, 1998, now U.S. Pat. No. 6,187,470, which claimed priority from U.S. Provisional Patent Application Ser. No. 60/049,413, filed Jun. 10, 1997, the disclosures of each of which are incorporated herein by this reference.

TECHNICAL FIELD

This invention relates to novel battery holders, especially for holding a plurality of battery cells, and to methods of using the same, particularly for small electric powered vehicles such as model trucks and model aircraft.

BACKGROUND

In the use of batteries to power electrical toys and tools, such as small electrically powered model cars or airplanes, it is often desirable to gang seven to ten rechargeable cells together to provide the desired amount of power. In fact, at this time, it quite is popular to use rechargeable cells of about 1.2 volts each, assembled in battery packs ranging from about 4 cells to about 12 cells per battery pack. At present, for use in model cars, the use of 6 cells per battery pack is preferred. In model aircraft, the use of from 8 to about 10 cells per battery pack is presently preferred.

In spite of the various schemes which have so far been offered to the marketplace for holding multiple batteries together in a pack, a continuing and growing demand exists for a simple, inexpensive method which can be used to maximize battery output, and to preserve and enhance the reliability of the batteries in the pack, as well as to enhance the service life of batteries between recharge cycles. A particular problem often seen in various prior art battery holders is the presence of spot welded or soldered junctions. Such junctions are usually somewhat resistant to electrical conduction, resulting in heating of the junction, sometimes to unacceptably high levels, which needlessly dissipates and wastes power.

As will be evident to those familiar with model cars, trucks, and aircraft, and to whom this specification is particularly addressed, a battery holder which effectively eliminates the loss of energy in soldered, welded, or other inefficient electrical joints would be of great benefit in increasing the operating life of such battery packs, when compared with battery holders which are currently in widespread use. Moreover, in competitive applications, such as model auto, boat, or aircraft races, a battery pack which can increase the output power and/or battery discharge cycle time, would be a welcome addition to the competitor's arsenal.

OBJECTS, ADVANTAGES, AND FEATURES OF THE INVENTION

From the foregoing, it will be apparent to the reader that one important and primary object of the present invention resides in the provision of a novel battery pack for ganging together a plurality of cells in a manner that maximizes the efficiency of extracting power from the battery cells in the pack.

Another important objective of the invention is to eliminate battery power loss due to resistive heating in spot welds or soldered joints, by providing a battery pack which avoids using such means for forming electrical connections.

Other important but more specific objects of the invention reside in the provision of novel battery packs which:
provide forces for strongly urging adjacent battery terminals together in electrical contacting fashion;
provide a protective cover to house the battery packs;
are highly efficient in supplying electrical power from rechargeable battery cells.

Other important objects, features, and additional advantages of my invention will become apparent to the reader from the foregoing and from the appended claims, and as the ensuing detailed description and discussion proceeds in conjunction with the accompanying drawing.

BRIEF DESCRIPTION OF THE DRAWING

In the drawing:

FIG. 9 is an end elevational view showing one method of assembly of the embodiment of my battery pack just illustrated in FIGS. 5, 6, 7, and 8, showing the use of wooden spacer blocks above the top and below the bottom end caps for installation of tightening bands, such as rubber bands, cord or fishing line, and for spacing the tightening bands away from the top and bottom end caps, during the step of heating and shrink wrapping the outer shrink wrap cover; after the shrink wrap cover is cooled and secured, the spacer blocks and the tightening bands are removed.

FIG. 10 is a front elevation view of a third embodiment of my novel battery pack, with a transparent shrink wrap cell holder sleeve body used for each of two battery columns, a flush style top and a flush style bottom end cap (each with electrical contacts), shown with the battery pack holding ten battery cells, and utilizing a strong tape, preferably filamented strapping type tape, for tightly urging the battery cells together for efficient electrical supply from the battery pack, and utilizing an outer transparent shrink wrap cover for additional force to compact batteries together in the pack.

FIG. 14 is a vertical end view of the embodiment of the battery pack just illustrated in FIGS. 10, 11, 12, and 13 above, now showing the fully assembled battery pack with the filamented strapping tape provided in secure, overlapping loop fashion, as seen through a transparent shrink wrap cover and revealing a column of five battery cells inside.

FIG. 16 is a reflected plan view of the interior of one embodiment of my end cap, showing the peripheral flange portions and the interior end; the cap may be utilized for either a top end cap or a bottom end cap by inserting appropriate electrical connectors.

FIG. 17 is a top plan view of the electrical connector bar used in a bottom end cap to electrically connect the bottom battery in a first column of batteries with the bottom battery in an second column of batteries.

FIG. 18 is a side elevation view of the electrical connector bar first illustrated in FIG. 17.

FIG. 19 is a perspective view of a flush type end cap, such as shown in FIGS. 10, 11, 12, 13, and 14.

FIG. 20 is a top view of the flush type end cap just shown in FIG. 19.

Figure 1:
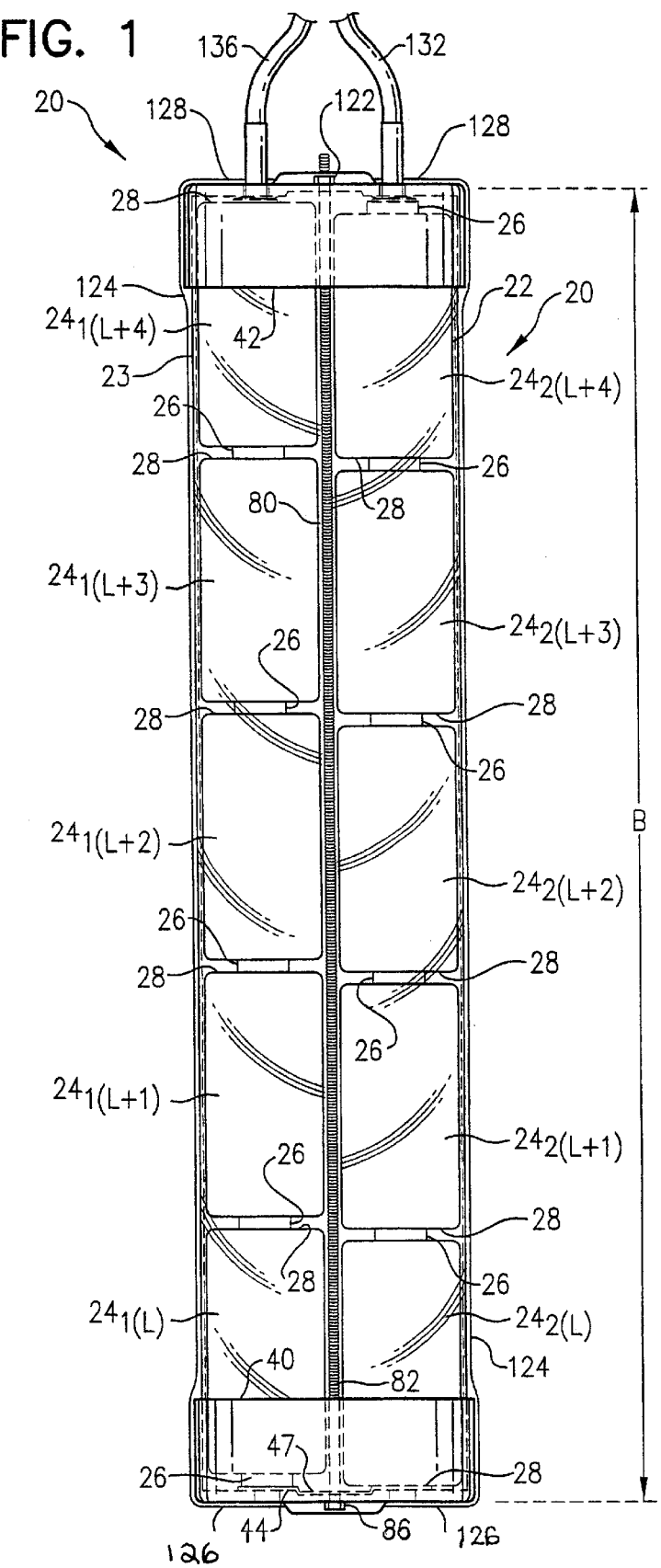
FIG. 1 is a front elevation view of one embodiment of my battery pack, with a transparent shrink wrap cell holder sleeve body for each of two battery columns, a top and a bottom end cap each with electrical contacts, utilizing threaded rod type compression stays, shown with the battery pack holding ten battery cells and having an outer shrink wrap cover for tightly urging the battery cells together for efficient electrical supply from the battery pack.

In the drawing, like structures are shown in the various figures with like reference numerals without further mention thereof. Also, similar structures are shown with the use of a prime (') or double prime (") mark, and although the same name may be utilized for such parts or structures, it is to be appreciated that the various embodiments may be distinguished by the designations provided.

DESCRIPTION

I have now invented, and disclose herein, a novel solderless battery pack for holding rechargeable battery cells. Importantly, utilizing my novel battery packs in a method of operating electrically powered vehicles, especially model aircraft and automobiles, provides the significant benefits of increased battery power and of extended battery life.

As seen in the embodiment depicted in FIG. 1, my battery packs 20 have in the central portion thereof a pair of elongated cell column holder sleeves 22 and 23, for a first column $C_1$ and a second column $C_2$ of battery cells 24, respectively. The cell holder sleeves 22 and 23 are preferably provided in a shrink wrap material which has a thin wall and a "see-through" optical property that allows the user to see through the cell holder sleeves 22 and 23 to confirm the visual appearance and the polarity orientation of each of the battery cells 24 that are confined and contained by the cell holder sleeves 22 and 23. More specifically, each of typical battery cells 24 has a positive terminal 26 and a negative terminal 28 at opposing ends of an elongate and normally cylindrical body portion 30 with outer surface 32. It is important that the positive 26 and negative 28 terminals in adjacent battery cells 24 be properly oriented to avoid creating an electrical short circuit at any pair of battery cells 24 in the battery pack 20.

Figure 2:
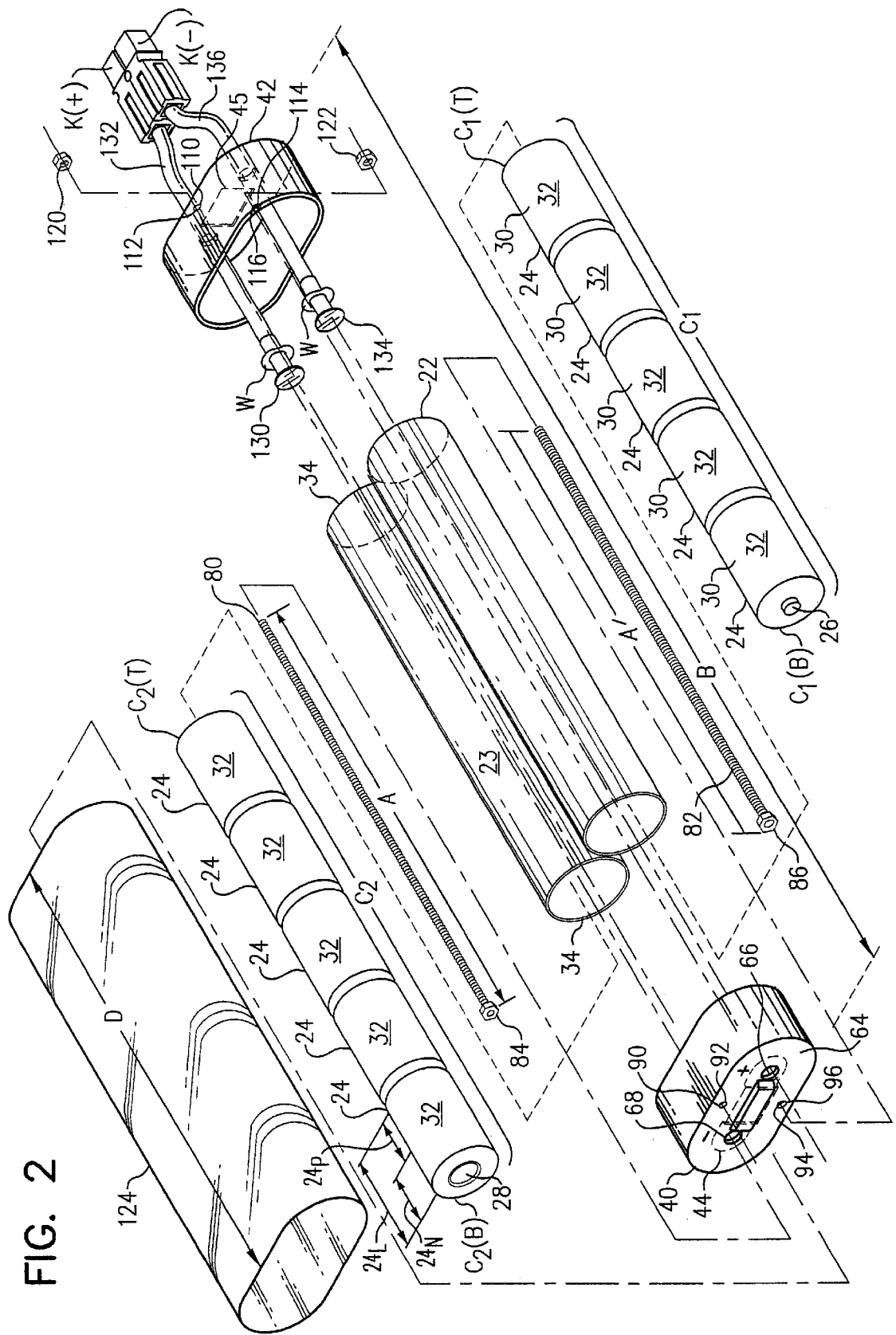
FIG. 2 is an exploded rear perspective view of the battery pack just illustrated in FIG. 1, now showing between the top and bottom end caps a first shrink wrap cell holder sleeve which contains a first column of battery cells, a second shrink wrap cell holder sleeve which contains a second column of battery cells, an outer shrink wrap cover for the battery pack, and a first and a second threaded compression stay with retaining nuts for securing the battery pack together.
Figure 3:
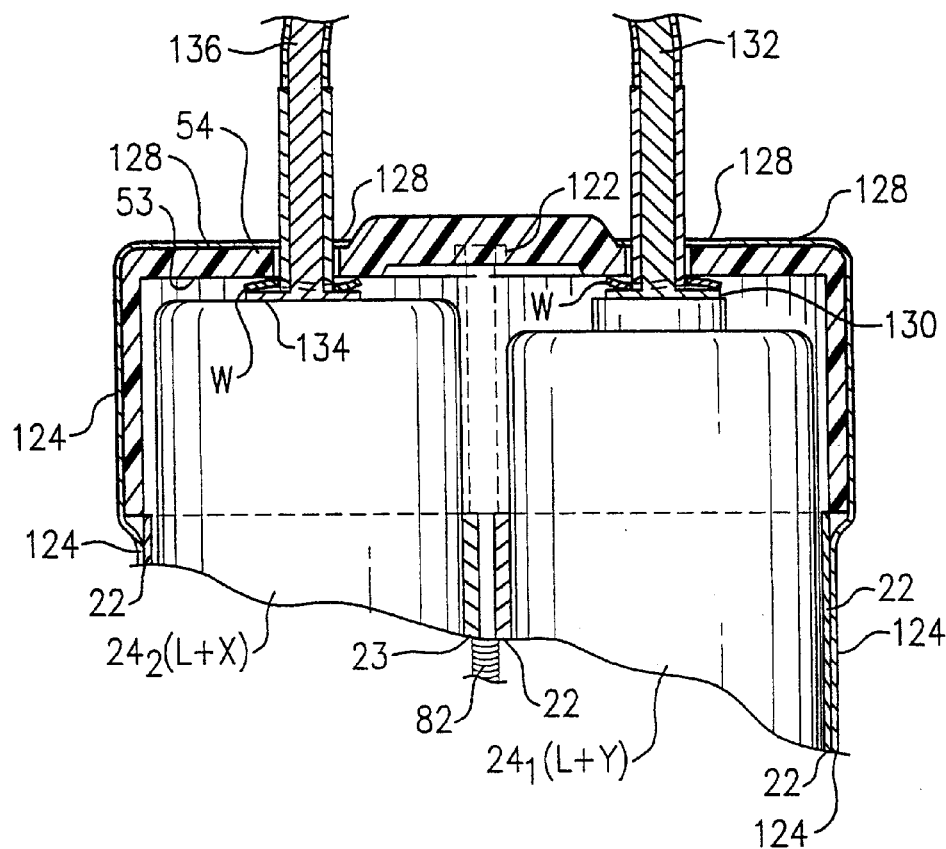
FIG. 3 is a front cross-sectional view of the top end of my battery pack, showing the electrical connection to positive terminals of a battery cell on one side and to a negative terminals of a battery cell on the other side, as well as the upper end of first shrink wrap cell holder sleeve which contains a first column of battery cells, the upper end of a second shrink wrap cell holder sleeve which contains a second column of battery cells, and the upper portion of an outer shrink wrap cover for the battery pack.
Figure 4:
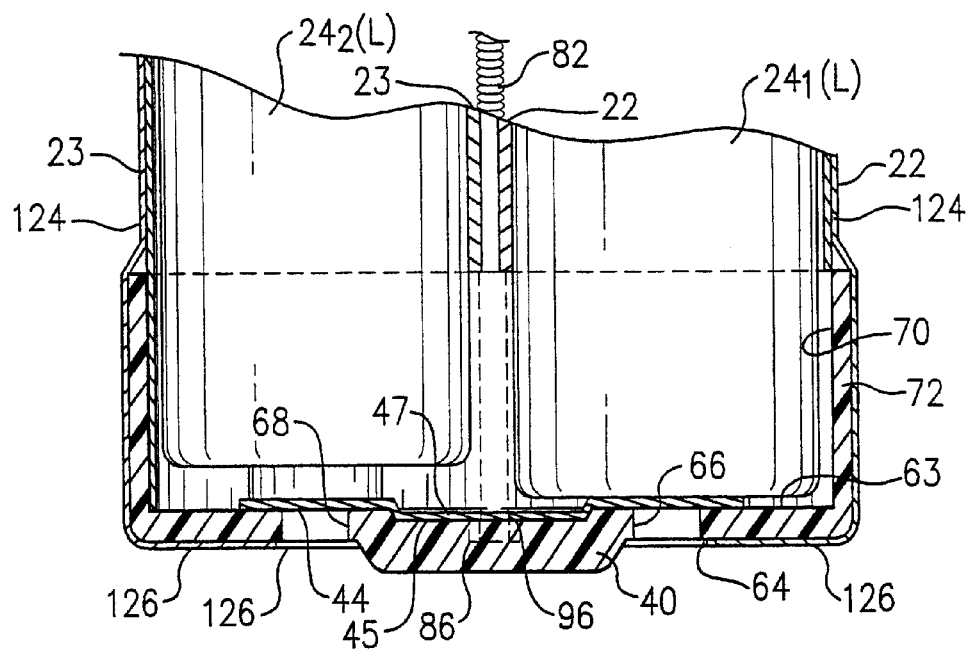
FIG. 4 is a front cross-sectional view of the bottom end of my battery pack, showing the electrical connector bar used in the bottom end cap to electrically connect a first battery column with a second battery column, as well as the bottom end of a first shrink wrap cell holder sleeve which contains a first column of battery cells, the bottom end of a second shrink wrap cell holder sleeve which contains a second column of battery cells, and the lower portion of an outer shrink wrap cover for the battery pack.

As better seen in FIGS. 2, 3, and 4, the cell holding sleeves 22 and 23, when provided in battery pack 20 in a configuration to hold a first $C_1$ and a second $C_2$ column of battery cells 24, substantially resembles two extended cylinders placed side-by-side extended along a common axis in a nip-roll type configuration. In this configuration, a pair of side-by-side battery cell sleeve holding tubes 22 and 23 are provided, each adapted for close fitting, shrink wrap compression engagement around and securely holding a plurality of battery cells 24 in a first battery cell column $C_1$ and in a second battery cell column $C_2$, respectively. Typically, a number of batteries P, where P is a positive integer, usually from 2 to five are located in each of a first $C_1$ and in a second $C_2$ column of battery cells. However, a larger number of batteries in a column and more than two battery columns in a battery pack are feasible in accord with the teachings herein. While this technique is most advantageously performed with rechargeable batteries, and often, sub-C type Ni-cad batteries, it is also feasible and at times quite advantageous with non-rechargeable batteries. Also, the methods and the structures taught herein are applicable to other battery sizes, such as AA, or AAA, or C size, and with other battery types, such as nickel metal hydride, or lithium, etc., as well as with the aforementioned Ni-cad type batteries.

Adjacent the first (upper or top as shown) end 34 and at the second (lower or bottom as shown) end 36 of the battery cell sleeve holding tubes 23 and 23, a high strength bottom end cap 40 and a high strength top end cap 42 are affixed, respectively. As seen in FIGS. 16, 17, and 18, inside the bottom end cap 40 is placed an elongate copper connector bar 44, for connecting the lowermost battery cell $24_{1(L)}$ in a first column with the lowermost battery cell $24_{2(L)}$ in a second column. In this manner, the first column $C_1$ of battery cells is a series of longitudinally co-axially oriented battery cells from lowermost cell $24_{1(L)}$ to uppermost cell $24_{1(L+X)}$, where an integer X of quantity $P_1-1$, and where $P_1$ is a positive integer greater than zero and representing the number of cells $P_1$ in the first column $C_1$. Similarly, a second column $C_2$ of battery cells 24 is a series of longitudinally co-axially oriented battery cells from lower most cell $24_{2(L)}$ to upper most cell $24_{2(L+Y)}$, where an integer Y of quantity $P_2-1$, where $P_2$ is a positive integer greater than zero and representing the number of cells $P_2$ in the second column. Additionally, while most commonly the number of cells $P_1$ in the first column is the same as the number of cells $P_2$ in the second column, occasionally it will be advantageous to utilize an uneven number of battery cells 24 between columns $C_1$ and $C_2$, and utilize a phantom cell in lieu of a battery cell, as further depicted in FIGS. 23, 24, and 25 below.

Also, it should be understood that while I have shown and explained my battery pack by use of the most commonly encountered two column configuration for battery cells, it is to be understood that any convenient integral number C of columns, from a single column (where the number of columns is $C_1$, up to any desired quantity of battery cell columns where $C_C$), could be accomplished by use of the techniques taught and claimed herein, by simply adding the desired number of battery cell holder sleeves (the number of sleeves provided match the desired number of columns), providing a bottom end cap 40 and of the top end cap 42 in the required shape, as well as providing electrical connectors in an appropriate electrical contacting configuration.

Figure 5:
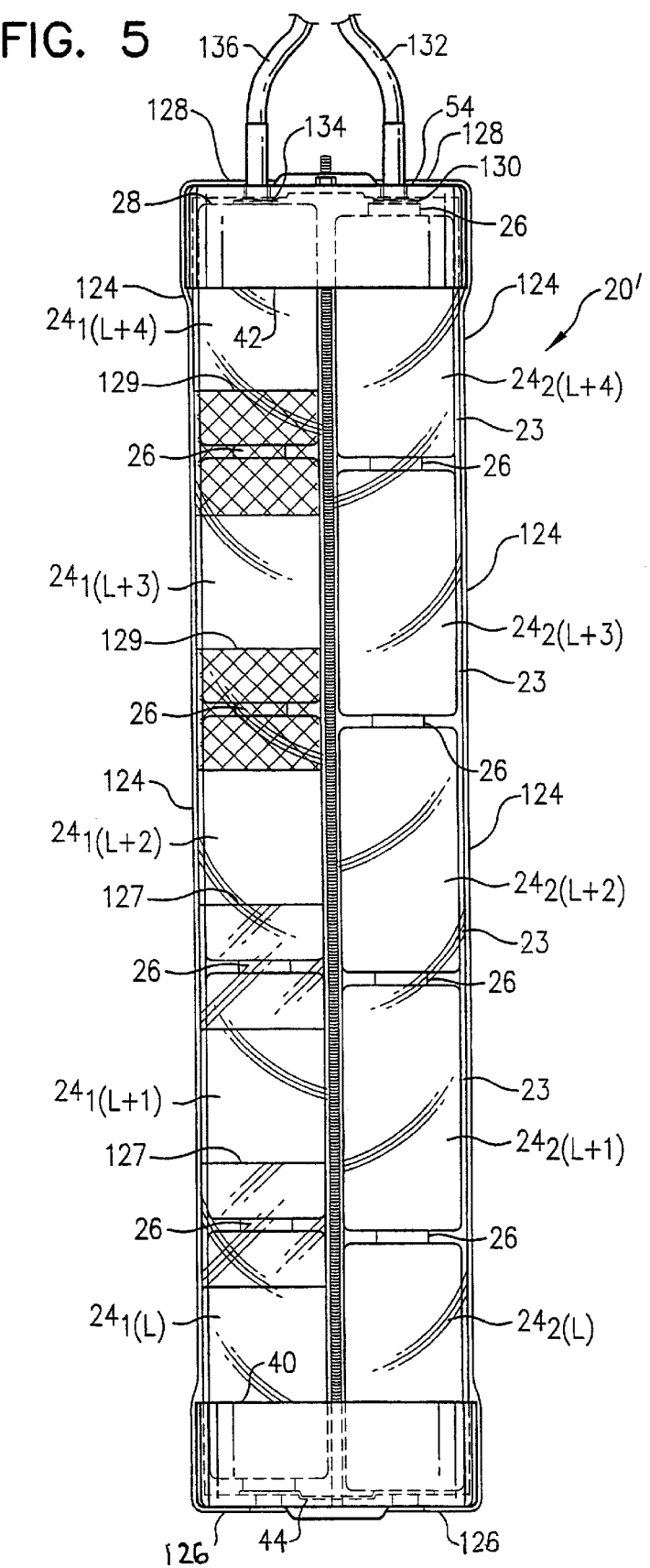
FIG. 5 is a front elevation view of a second embodiment of my novel battery pack, with a transparent shrink wrap cell holder sleeve body for one of two battery columns, showing a first shrink wrap cell holder sleeve which contains a first column of battery cells, a a second column of battery cells in which adjacent battery cells are, at two joints, are affixed together with a short shrink wrap tube, and, at two other joints, are affixed together with strapping tape, and also having an outer shrink wrap cover for the battery pack, shown with the battery pack holding ten battery cells.
Figure 6:
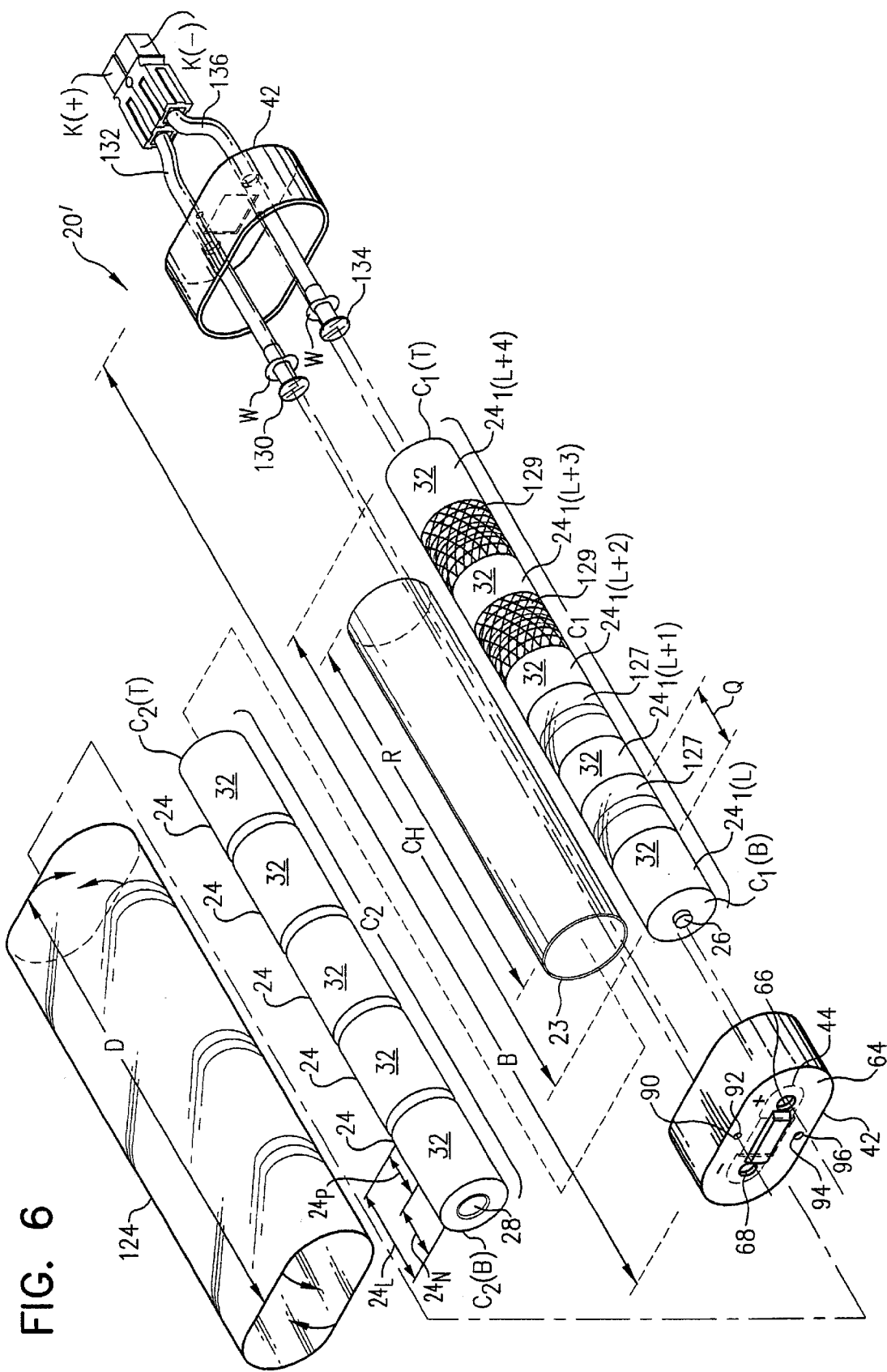
FIG. 6 is a rear exploded perspective view, somewhat similar to the battery pack just illustrated in FIG. 2, now showing the top and bottom end caps, a first shrink wrap cell holder sleeve which contains a first column of battery cells, a second column of battery cells in which adjacent battery cells are, at two joints, are affixed together with a short shrink wrap tube, and, at two other joints, are affixed together with strapping tape, and in which an outer shrink wrap cover is utilized for securing the battery pack together.
Figure 7:
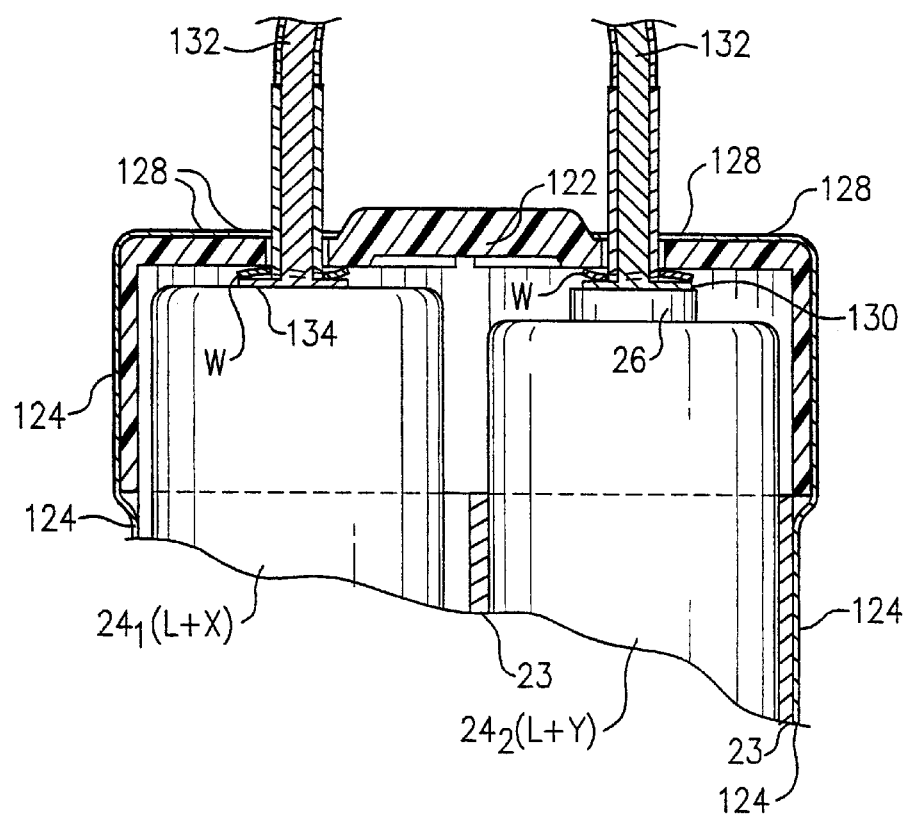
FIG. 7 is a front cross-sectional view of the top end of my battery pack as just illustrated in FIGS. 5 and 6, now showing the electrical connection to positive terminals of a battery cell on one side and to a negative terminals of a battery cell on the other side, as well as the upper end of first shrink wrap cell holder sleeve which contains a first column of battery cells, and the upper portion of an outer shrink wrap cover for the battery pack.
Figure 8:
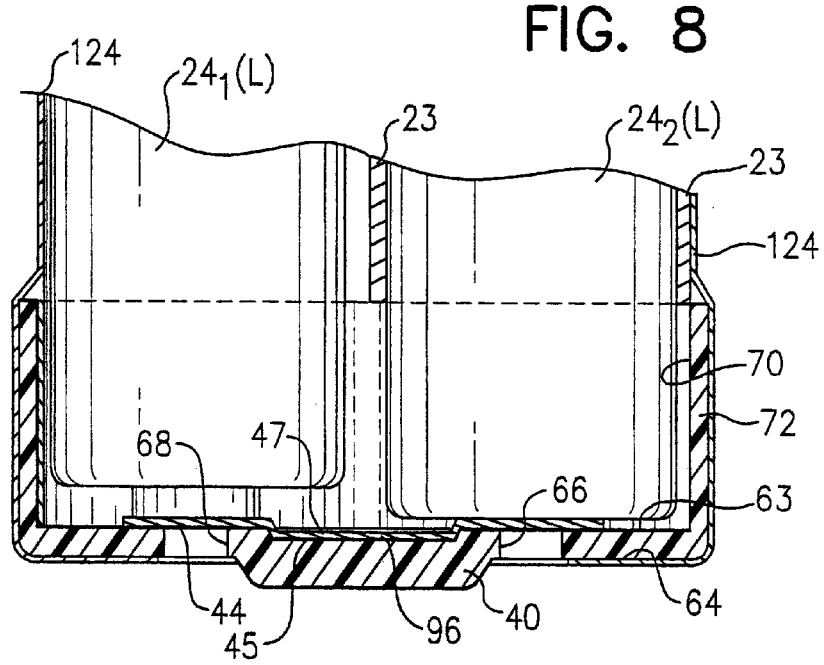
FIG. 8 is a front cross-sectional view of the bottom end of my battery pack just illustrated in FIGS. 5, 6, and 7, now showing the electrical connector bar used in the bottom end cap to connect a first battery column with a second battery column, as well as the bottom end of a first shrink wrap cell holder sleeve which contains a first column of battery cells, and the lower portion of an outer shrink wrap cover for the battery pack.

Referring now to FIG. 16, it can be seen that top end cap 42 has an interior end wall portion 53, and first and second electrical lead line passageways defined by sidewalls 56 and 58. Also, as can be seen in FIGS. 3, 5, and 7, for example, an exterior end wall portion 54 is located opposite interior end wall portion 53. The interior wall 60 of peripheral wall flange 62 (of thickness T) extends outward from interior end wall portion 53 to cover and confiningly contain at least that portion of the outer surface 32 of battery cell 24 which is adjacent the first or top end $C_1$ (T) of the first column $C_1$, and adjacent the first or top end $C_2$ (T) of a second column $C_2$ of batteries 24. Similarly, as can be appreciated by inspection of FIGS. 2, 4, and 6, the bottom end cap 40 has an interior end wall portion 63, an exterior end wall portion 64. For minimizing parts requirements, the bottom end cap 40 may include unused first and second electrical lead line passageways defined by sidewalls 66 and 68, in order that the part can also be utilized as a top end cap 42. In other words, to minimize costs, the top 42 and bottom 40 end caps may be molded identically. In the bottom end cap 40, the interior wall 70 of peripheral wall flange 72 extends outward from interior end wall portion 63 to cover and confiningly contain at least that portion of the outer sidewall 32 of battery cell 24 adjacent the bottom end $C_1$ (B) of first column $C_1$, and adjacent the bottom end $C_2$ (B) of second column $C_2$.

Preferably, for electrical connection between the positive terminal 26 at the bottom end C1 (B) of first column $C_1$, and the negative terminal 28 at the bottom end $C_2$ (B) of second column $C_2$, an electrical connector bar 44 is added in the bottom end cap 40. The bar 44 is placed in connector bar receiving indentation 45 (normally provided in both of the preferably identical molded plastic portions of bottom 40 and top 42 end caps). The connector bar 44 has a centrally located pocket or land portion 47 sized and shaped complementary to the indentation 45, for secure engagement of the connector bar 44 in its operating location. Usually, I prefer a thin connector bar 44, such as about 1/32" in thickness KK.

In the embodiment of my battery pack shown in FIGS. 1, 2, 3, and 4, to help the user assure that polarity of batteries is correctly maintained, the battery pack 20 preferably uses a first stay-bolt 80 and a second stay-bolt 82 which are not interchangeable, i.e., they are of different in configuration, so that they are not reversible. To assure this arrangement is achieved, one ideal configuration is to use stay-bolts of different diameter. I prefer to use a first stay-bolt 80 of "allthread" configuration in a rather small diameter, such as a 4–40 size, and a different small diameter "allthread" second stay-bolt 82, preferably in the 2–56 size. Each of first 80 and second 82 stay-bolts are provided in a length A and A' respectively. This length is suitable to accommodate the overall length B of the battery pack 20, made up of the length of the battery column $C_1$ and the thickness of the bottom 40 and top 42 end caps of a pre-selected size (i.e., including a desired type and number of battery cells 24 and top 42 and bottom 40 end cap design). Sometimes, it may be desirable that one of the nuts on each stay-bolt, normally the bottom nut 84 on the first stay-bolt 80, and the bottom nut 86 on the second stay-bolt 82, can be permanently secured, to their respective stay-bolts, to simplify removal and reattachment of the stay-bolts.

As can be seen from comparing FIGS. 1 and 2 battery cells 24 in the battery pack 20 are securely compressed for tight fitting engagement of their respective positive 26 and negative 28 terminals, in a properly configured series polarity fashion, by:

(a) inserting a first column $C_1$ battery cells 24 in a battery cell holder sleeve 22, carefully and properly aligning the polarity to avoid a short circuit;

(b) inserting a second column $C_2$ of battery cells 24 in a battery cell holder sleeve 23, carefully and properly aligning the polarity to avoid a short circuit;

(c) shrinking each of cell sleeve holders 22 and 23 so that the cell sleeve holders are tightly griping and securing therein the batteries 24 in each of the respective columns $C_1$ and $C_2$;

(d) inserting the first stay-bolt 80 through the first stay passage 90, defined by sidewall 92 in bottom end cap 40, (e) inserting second stay-bolt 82 through the second stay passage 94, defined by sidewall 96 in bottom end cap 40;

(f) inserting battery cell holder sleeves 22 and 23 into a confined relationship with interior 70 of the peripheral flanged wall 72 of the bottom end cap 40, carefully observing the polarity markings "–" and "+";

(g) running first and second stay-bolts longitudinally along the main axis of the battery pack;

(h) inserting the first stay-bolt 80 through the first stay passage 110 defined by sidewall 112 in top end cap 42, carefully observing the polarity markings on the top end cap 42, and insuring that such polarity markings agree with the orientation of the battery cells in the cell holder sleeves 22 and 23, and that each of the first 80 stay-bolt and second 82 stay-bolt is inserted into the stay passageway of proper size;

(i) inserting the second stay-bolt 82 through the second stay passage 114, defined by sidewall 116 in top end cap 42;

(j) affixing top nut 120 to first stay-bolt and initially tightening the nut 120 finger tight;

(k) affixing top nut 122 to second stay-bolt 82 and initially tightening the nut 122 finger tight;

(l) tightening both top nut 120 and 122 in a balanced fashion to bring substantially uniform pressure to both the first 80 stay-bolt side and the second 82 stay-bolt side of both the top end cap 42 and the bottom end cap 40, so as to evenly and firmly apply compressive force on a cell-to-cell basis, and from the uppermost cell $24_{1(L+N)}$ in the first column, and the upper most cell $24_{2(L+M)}$ in the second column, to the respective positive electrical lead line contactor and negative electrical lead line contactor;

(m) covering the assembled product from the preceeding steps with an outer shrink wrap tube 124, wherein the shrink wrap tube length D is sized slightly longer than the aforementioned overall length B of battery pack 20 (preferably about 0.25 inches overlap is provided in the shrink wrap tube 124 at the top and also at the bottom ends, i.e., [D+0.5 inches]=B); and (n) shrinking the outer shrink wrap tube 124 to provide a compressive force on the bottom end cap 40 by way of a bottom overlapping ring 126 of shrink wrap thereon, and to provide a compressive force on the top end cap 42 by way of a top overlapping ring 128 of shrink wrap thereon.

For both the shrink wrap cell holder sleeves 22 and 23, as well as for the outer shrink wrap tube 124, I prefer to utilize a transparent plastic shrink wrap material of a preselected size as may be obtained from RJI International Corporation, Reno, Nev., or from a wide variety of other suppliers of shrink wrap material.

After the battery pack has been prepared, connectors K(+) and K(–) are used to connect the positive and negative lead lines (discussed below) to the apparatus being driven. For electrical connector K(–) I prefer to use a black housing, model number 1327G6, and for electrical connector K(+) I prefer to use a red housing, model number 1327, and for both I prefer to utilizize electrical contacts model number 1331, all from Anderson Power Products, a Division of High Voltage Engineering, 145 Newton Street, Boston, Mass. 02135.

In FIG. 5, a second embodiment of my battery pack 20' is illustrated. This FIG. 5 shows a front elevation view of a battery pack 20' which utilizes a shrink wrap type cell holder sleeve 23 of length R for one column $C_1$ of batteries. I prefer to provide the cell holder sleeve 23 length R such that the length R is less than the overall column height $C_H$ by about the height of one battery 24, so that about one-half of each of the bottom battery $23_{2(L)}$ and the top battery $23_{2(L+X)}$ is not covered by the sleeve 23. Likewise, when a cell holder sleeve 22 is utilized for column $C_1$, a length R is utilized that is less than column height $C_H$ of column $C_1$ by about the height of one battery 24. Alternately, as shown in FIGS. 5 and 6, and which can be easily understood from the perspective view of FIG. 6, either short cylindrical tubes 127 of shrink wrap of width Q can be used to join adjacent batteries 24. Alternately, short strips of adhesive tape 129 can be used to join adjacent batteries 24. Either of the methods utilized for column $C_2$ as just explained allows for improved thermal conductivity, i.e. better cooling of batteries. Moreover, it should be understood that in lieu of the just described method for joining adjacent batteries in a column, the "shrink wrap" method of preparing a battery pack 20', without the use of stays (e.g., items 80 and 82 in FIG. 2) can also be accomplished by using, in each of the multiple columns (e.g., $C_1$ and $C_2$) for sets of battery cells 24, a thin-wall battery cell holder shrink wrap sleeve 22 or 23 for each column.

One method of building the battery pack 20' just illustrated in FIGS. 5, 6, 7, and 8 is shown in FIG. 9. Here in FIG. 9, an end elevational view shows the use of a wooden spacer block ST above the top end cap 42, and a wooden spacer block SB below the bottom end cap 40, for installation of tightening bands TB. The tightening bands TB can be any convenient material for forming the appropriate compression during installation of the outer shrink wrap 124, such as rubber bands, cord or fishing line. The spacer blocks ST and SB allow for spacing the tightening bands away from the top 42 and bottom 40 end caps during the step of heating and shrinking the outer wrap 124. After the outer shrink wrap 124 is cooled and secured, the spacer blocks ST and SB, as well as the tightening bands TB, are removed.

Figure 26:
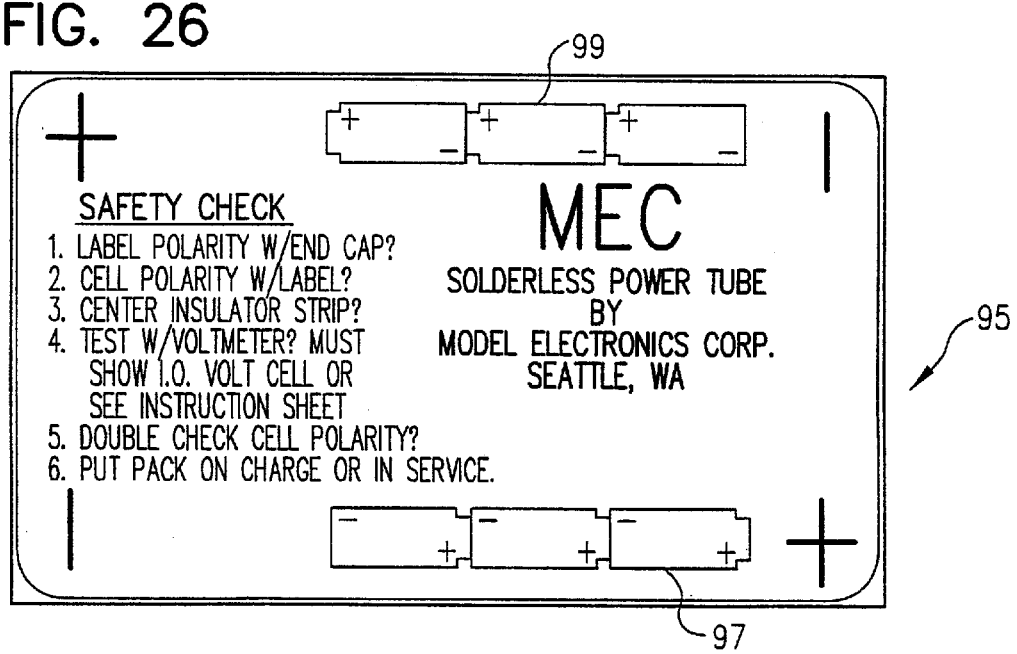
FIG. 26 is a top plan view of a thin, preferably adhesively backed label for affixing to my battery pack, which is especially useful in my repair kit for battery packs.

As noted in FIG. 26, to assist the user in keeping polarity of batteries correct, I have found it useful to provide a label 95 with reference indicia 97 and 99 thereon (as well as "−" and "+" terminal markings) so that both end caps and the batteries are be properly assembled into a finished battery pack 20 or 20', for example, when the user rebuilds the battery pack utilizing my rebuild kit. The just mentioned reference indica are preferably applied externally by affixing the label 95 near the middle of the transparent outer shrink wrap tube 124.

Battery cells 24 must be properly prepared prior to inserting the same into the shrink wrap type battery cell holding sleeves 22 and 23 of my Solderless Power Tube (tm) battery pack 20, 20', or 20" as discussed below. For example, Sanyo brand 2000 milli-amp-hour ("mah") Sub-C cells have outer wrappings, and the top layer must be removed in order that the positive and negative parts of adjacent battery cells can touch each other when such cells are stacked into a column C. For removing the top layer, the Sanyo brand cell should be held with the bottom or negative side up, and the top covering layer is slit and peeled from the cell. However, care must be taken to prevent damage to the second or bottom wrap layer, as it is the only protection against a short circuit. On the other hand, Panasonic brand 1700 "mah" cells have only one outer covering layer, and require no preparation for placement in my battery pack. In any case, once the covering of the selected battery 24 is properly configured, I recommend that the terminals on each battery cell be properly cleaned by rubbing both the positive and the negative terminals of each cell with "Scotch-Brite" (tm) brand scouring pads, made by 3-M Corporation of Minneapolis, Minn., or similar material. Steel wool should not be used, as it may have deleterious effects, including the creation of short circuits. Also, if damaged insulation is found on any of the selected battery cells, it must be repaired before the cell is placed into the battery pack 20, 20', or 20".

Figure 15:
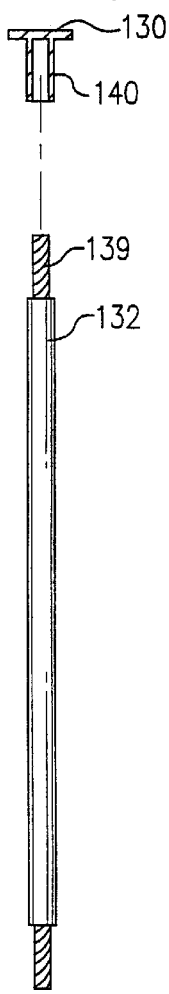
FIG. 15 is a partial cross-sectional view of the construction of electrical connectors used for external connection to the battery pack, showing the electrical contacts used, the preferred hollow copper contacts, and the heavy flexible wire utilized.

The Solderless Power Tube (tm) battery pack allows high current flow, because the unique design provides the smallest possible number of electrical connections. The connections which are present are designed to carry high current with the smallest possible resistance. The battery cells 24 touch each other, under compression, in series in columns, with absolutely nothing in between adjacent cells in the same column. Also, the cross-over connection bar 44 between columns is preferably made of silver plated copper, and is designed to carry a high current load. The positive electrical contact 130 (affixed to the positive electrical lead 132) and the negative electrical contact 134 (affixed to the negative electrical lead 136) of the battery pack 20 are preferably made of copper, also. As noted in FIG. 15, the positive and negative lead lines 132 and 136, respectively, are preferably provided in 14 gauge insulated copper wire 139 over which a hollow cylindrical portion 140 and 142 of the positive 130 and negative contacts 134, respectively, are crimped. Further, a "wave washer" W (see FIGS. 2, 3, and 6, for example) is provided between each of the positive and negative contacts and the interior wall 53 of the top end cap 42, to keep the copper positive 130 and negative 132 contacts flat on their respective positive and negative contacts on cells $24_{1(L+Y)}$ and $24_{2(L+X)}$ to assure that the most efficient electrical connection possible is attained.

As just described, the opposing top and bottom end caps and the thin walled shrink wrap type battery cell sleeves 22 and 23 are secured together in a single battery pack 20 assembly. Compression and security of the battery pack 20 package may be enhanced by use of adjustably tightenable fasteners, preferably in the form of stays, such as the all thread bolts above described. Also, it is important to emphasize that preferably, the all-thread bolts are each of different size, to aid in keeping the polarity of the batteries correct. As noted above, I prefer to use a 4–40 all-thread bolt on one side, and a 2–56 all thread bolt on the other side. Nuts of appropriate size are provided on either end of the all thread bolts, above the upper end and below the lower end, respectively, of the top 42 and bottom 40 end caps. The nuts are tightened until the cells in the pack 20 are adequately compressed together and against the contacts provided. As described, no solder joints are used, and the battery power is efficiently provided to the apparatus using the battery pack. Alternately, as further described herinbelow, strapping tape can be utilized to provide a compact, high efficiency, tightly bound battery pack.

For model cars, it is common to utilize six (6) Ni-cad type cells 24 in a battery pack 20. For model aircraft, it is more common to utilize ten (10) or twelve (12) cells. In the later case, amperage may range from ten (10) to eighty (80), depending upon the amount of instantaneous work being done by the electric motor.

Figure 23:
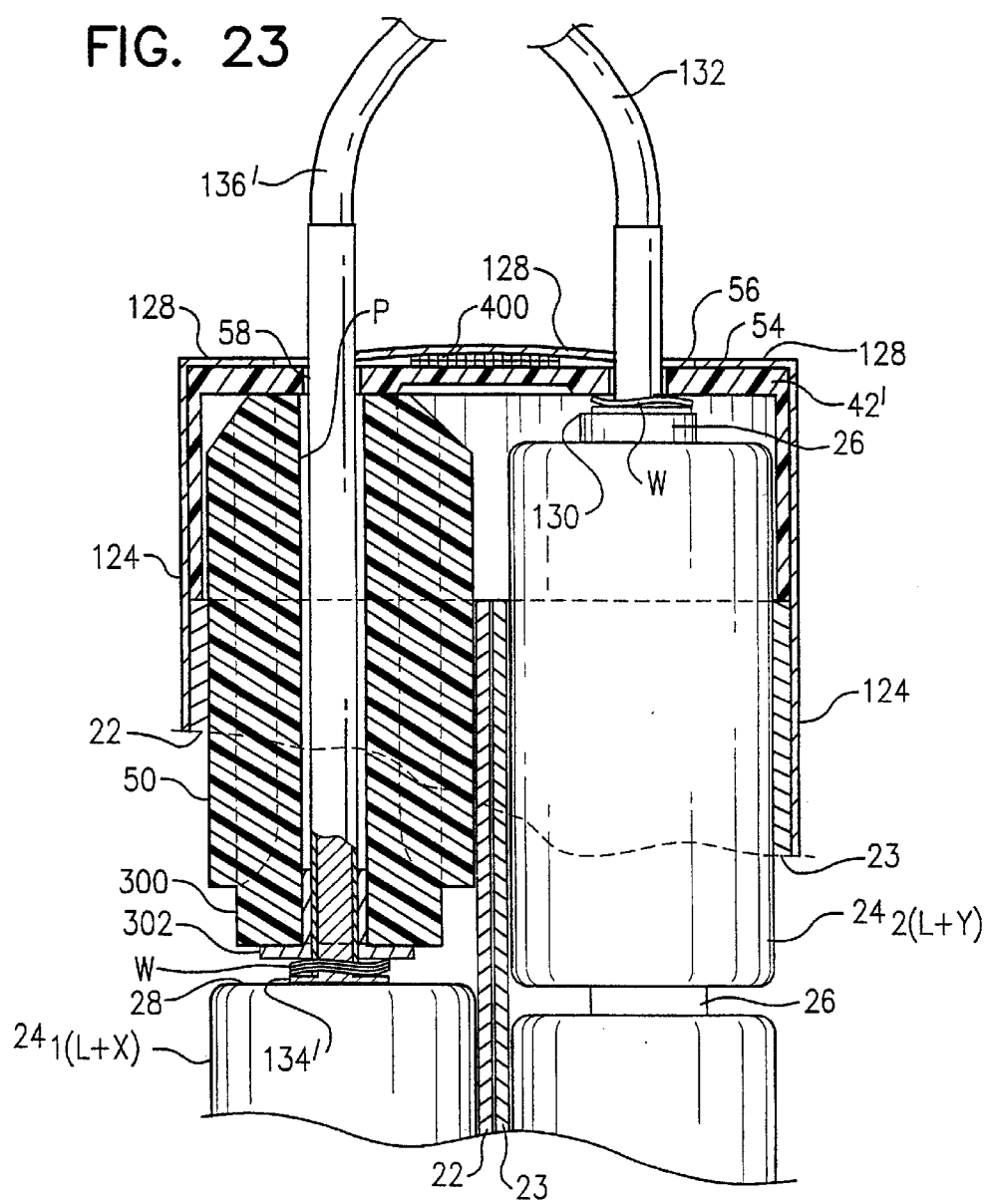
FIG. 23 is a front vertical cross sectional view of a battery pack, similar to the view shown in FIG. 12, but now showing the use of a "phantom" cell in lieu of one battery in the battery pack.
Figure 24:
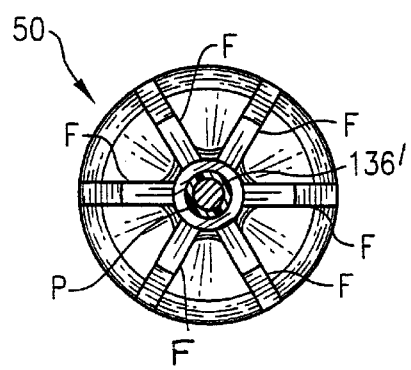
FIG. 24 provides a top view of the structure of the phantom cell just shown in FIG. 23, taken looking down from line 24—24 of FIG. 25.
Figure 25:
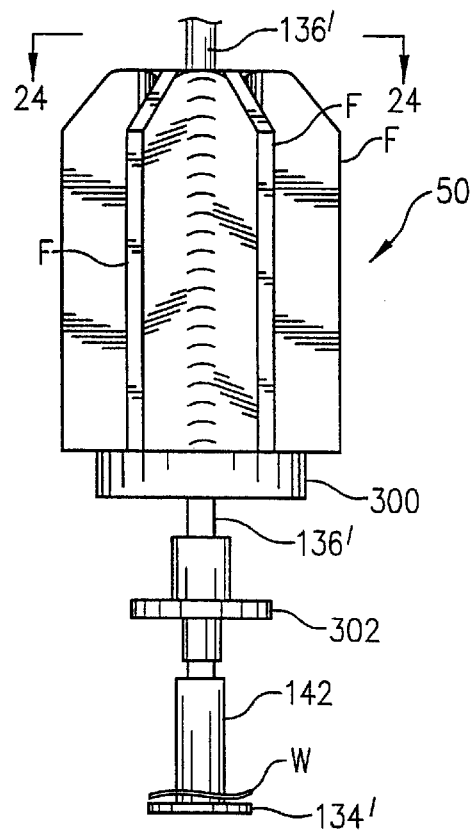
FIG. 25 provides a side elevation view of the "phantom" cell just illustrated in FIGS. 23 and 24.

Especially in various competitive situations, where battery pack limitations are prevalent, it is sometimes found that it is desirable to place an odd number of batteries in a battery pack 20. In such cases, a phantom cell 50 as shown in FIGS. 23, 24, and 25 can be utilized. Ideally, the phantom cell approximates in size and shape one of the battery cells 24 being removed from the battery pack 20. For heat dissipation, I prefer the use of a fluted design, having multiple flutes F spaced about a central, preferably cylindrically walled passageway P that allows an extended length lead line 136' to pass therethrough. For increased cooling, a base 300 can be provided to space the phantom cell 50 upward from the battery on which it sets. Also, tubular flanged bushing 302 can be provided for locating electrical contacts, such as contacts 134', below the phantom cell 50.

Turning now to FIG. 10, a front elevation view of a third embodiment of my novel battery pack, designated as pack 20", is provided. In this embodiment, a preferably transparent shrink wrap cell holder sleeve body 22 and 23 is provided for each of two battery columns $C_1$ and $C_2$. A flush style upper end cap 42' is provided, and a corresponding flush style lower end cap 40' is provided. The flush style end caps, as further explained in FIGS. 19, 20, and 21 below, allow the battery pack 20" to be provided without an outwardly protruding ledge adjacent the uppermost and lowermost batteries in the pack, due to the shape of the end caps provided.

Figure 11:
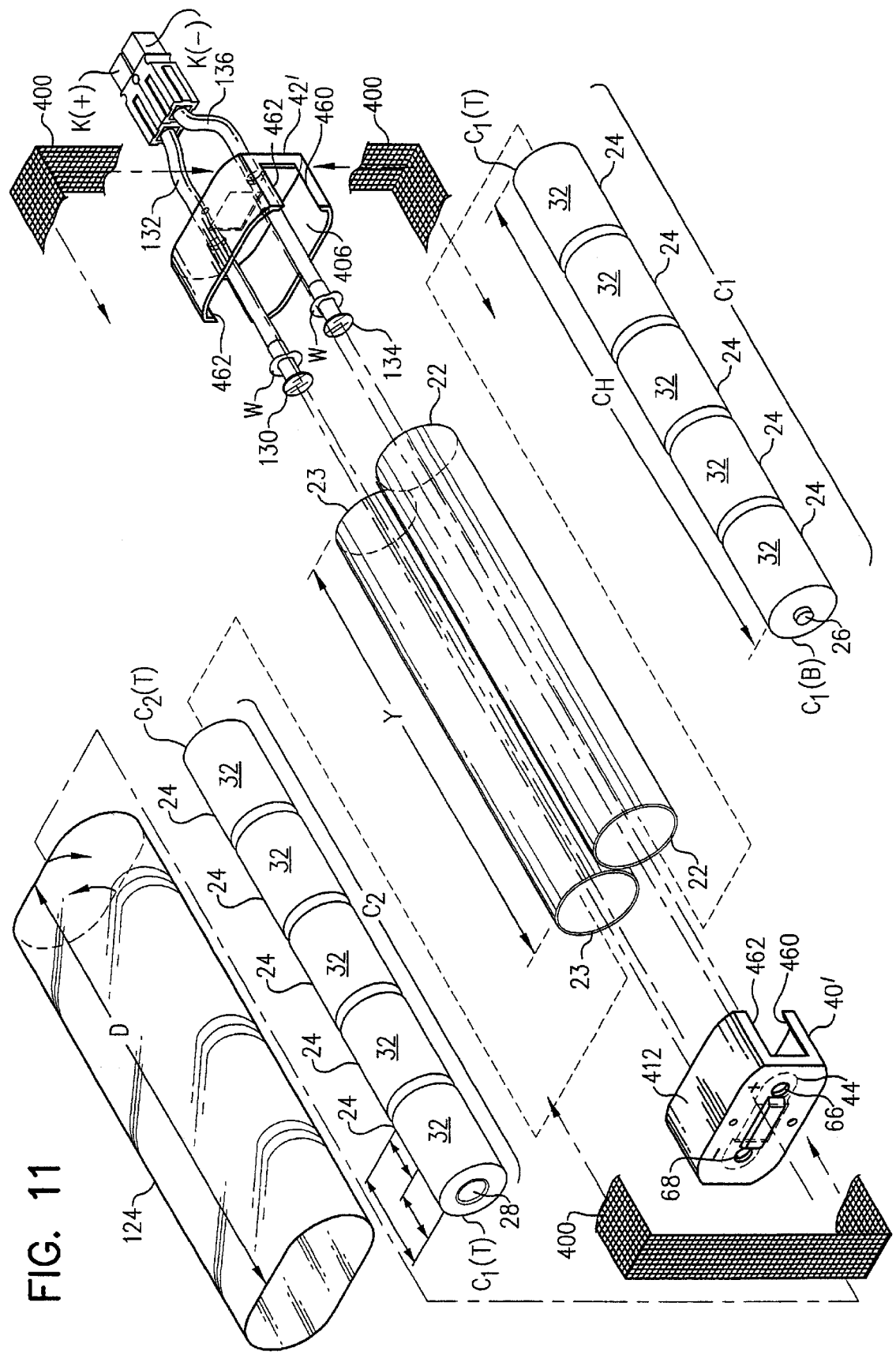
FIG. 11 is a rear exploded perspective view of the battery pack just illustrated in FIG. 10, showing the top and bottom end caps, a first shrink wrap cell holder sleeve which contains a first column of battery cells, a second shrink wrap cell holder sleeve which contains a second column of battery cells, the start of winding filamented strapping tape around the battery pack over the top and bottom flush style end caps and along the longitudinal axis of the battery pack, and the use of a transparent outer shrink wrap cover for the battery pack.

To firmly and securely fasten the battery pack 20", a strong, stretch resistant tape, preferably filamented strapping type tape 400 is utilized for tightly urging the battery cells 24 together, for efficient electrical supply from the battery pack 20". One exemplary strapping tape is a filamented type strapping tape manufactured by 3M of St. Paul, Minn., and is sold under the Scotch Brand mark, #893, for both 0.75 inch wide and 0.5 inch wide versions. The use of strapping tape is especially advantageous since it eliminates the need for a mechanical stay, such as the threaded rods described above and shown in FIGS. 1 and 2, thus reducing part count, weight, and cost, as well as simplifies the manufacture of my battery pack. In the embodiment shown in FIGS. 10 and 11 of my battery pack 20", in addition to tape 400, the outer shrink wrap cover 124 provides yet an additional force, in the manner described above, to compact batteries together in the pack 20". The complete longitudinally extending and top 42' and bottom 40' end cap encircling taping procedure which I prefer can be conceptually envisioned from FIGS.

Figure 22:
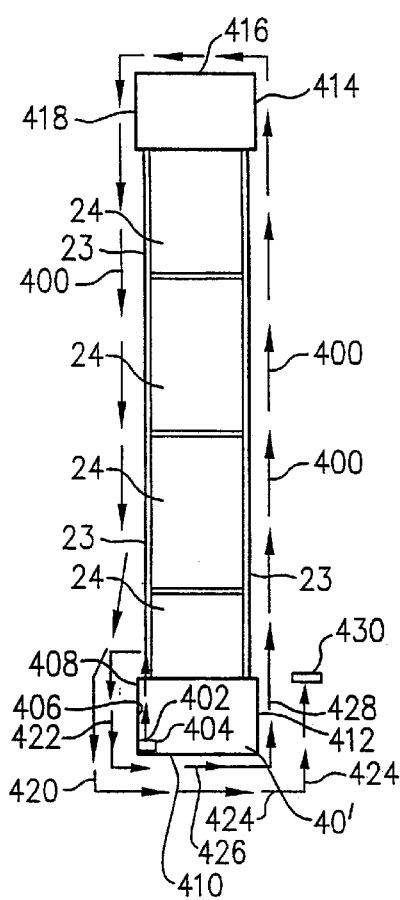
FIG. 22 is a side elevation view of a battery pack, providing a schematic illustrating the method of wrapping strapping tape around a partially assembled battery pack in order to maximize the strength of the resultant pack structure, in order to produce a finished battery pack such as just illustrated in FIG. 21.

10, 11, and 21. However, in FIG. 22, one exemplary method of wrapping the strapping tape 400 is detailed. The battery pack 20" is provided with columns of batteries 24 already shrink wrapped with cylindrical shrink wrap sleeves 22 and/or 23. Then, a first end 402 of tape 400 is affixed at a starting point 404 inside the bottom end cap 40'. The tape 400 is affixed up the inside wall 406 of bottom end cap 40'. Then, the tape is turned downward and affixed to a first outer wall 408 of end cap 40'. Next, the tape 400 is turned to cover a strip across the bottom 410 of bottom end cap 40'. Then, the tape is turned upward along a second outer wall 412 of the bottom end cap 40'. The tape is extended further upward tautly to the top end cap 42', where the tape 400 is affixed to the first outer wall 414, then across the top end 416, and down across a second outer wall 418. Next, tape 400 is tautly stretched to the first outer wall 408 of the bottom end cap 40', where a second tape layer 420 is applied over a first tape layer 422 earlier affixed. Likewise, a second tape 424 is applied to a first tape layer 426 on the bottom 410, and to a first tape layer 428 on the second outer wall 418, to a convenient end point 430. When the strapping tape 400 is tautly applied as just described, then when the outer shrink wrap 124 is applied and shrunk in place, those portions of the tape 400 extending between the end caps 40' and 42' are compressed, increasing their tension, and further compressing the batteries 24 against each other, and increasing the compactness of the pack 20".

Figure 12:
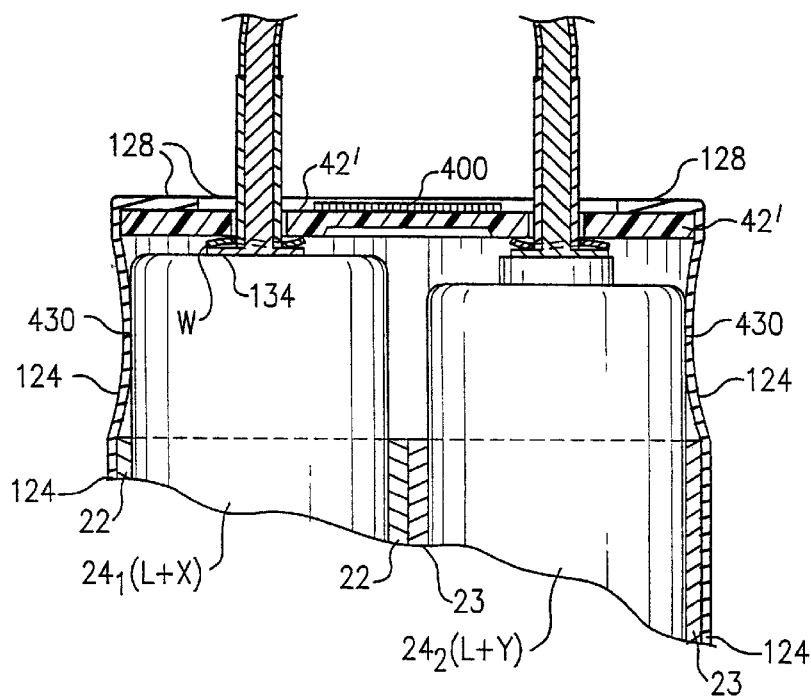
FIG. 12 is a front cross-sectional view of the top of the embodiment of my battery pack just illustrated in FIGS. 10 and 11, now showing the electrical connection to positive terminals of a battery cell on one side and to a negative terminals of a battery cell on the other side, as well as the upper end of first shrink wrap cell holder sleeve which contains a first column of battery cells, the upper end of a second shrink wrap cell holder sleeve which contains a second column of battery cells, the upper wrapping of tape over the top end cap, and the upper portion of a transparent outer shrink wrap cover for the battery pack.
Figure 13:
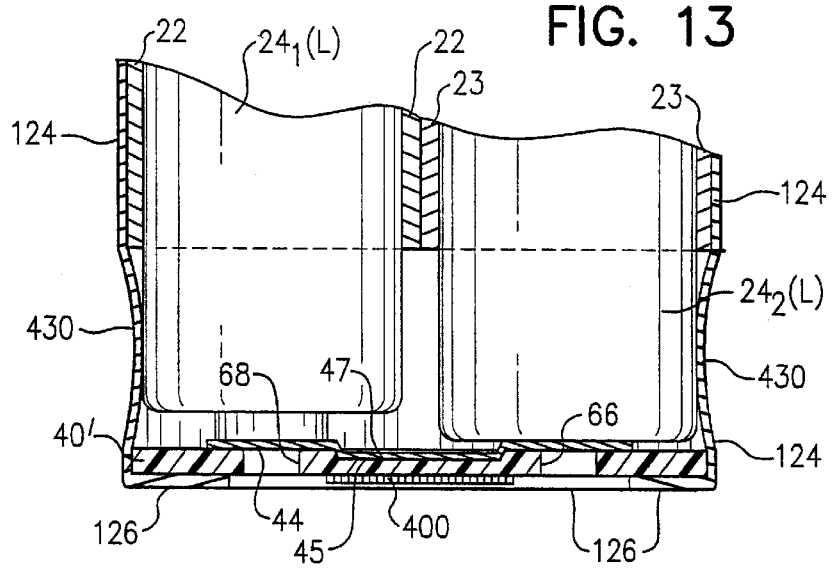
FIG. 13 is a front cross-sectional view of the bottom end of my battery pack just illustrated in FIGS. 10, 11, and 12, now showing the electrical connector bar used in the bottom end cap to connect a first battery column with a second battery column, as well as the bottom end of a first shrink wrap cell holder sleeve which contains a first column of battery cells, the bottom end of a second shrink wrap cell holder sleeve which contains a second column of battery cells, the bottom wrapping of tape under the bottom end cap, and the lower portion of an outer shrink wrap cover for the battery pack.

Further details of the embodiment similar to that just discussed appear in FIGS. 12 and 13, where front cross-sectional top and bottom views, respectively, are shown for the battery pack 20", with the strapping tape 400 in place, over the top end cap 42' and under the bottom end cap 40', and with the outer shrink wrap cover 124 fully compressed and in place. Note how, when utilizing the flush type top end cap 42' and flush type bottom end cap 40' that the shrink wrap 124 forms a slight concave impression 430 to further grip the adjacent battery.

Figure 21:
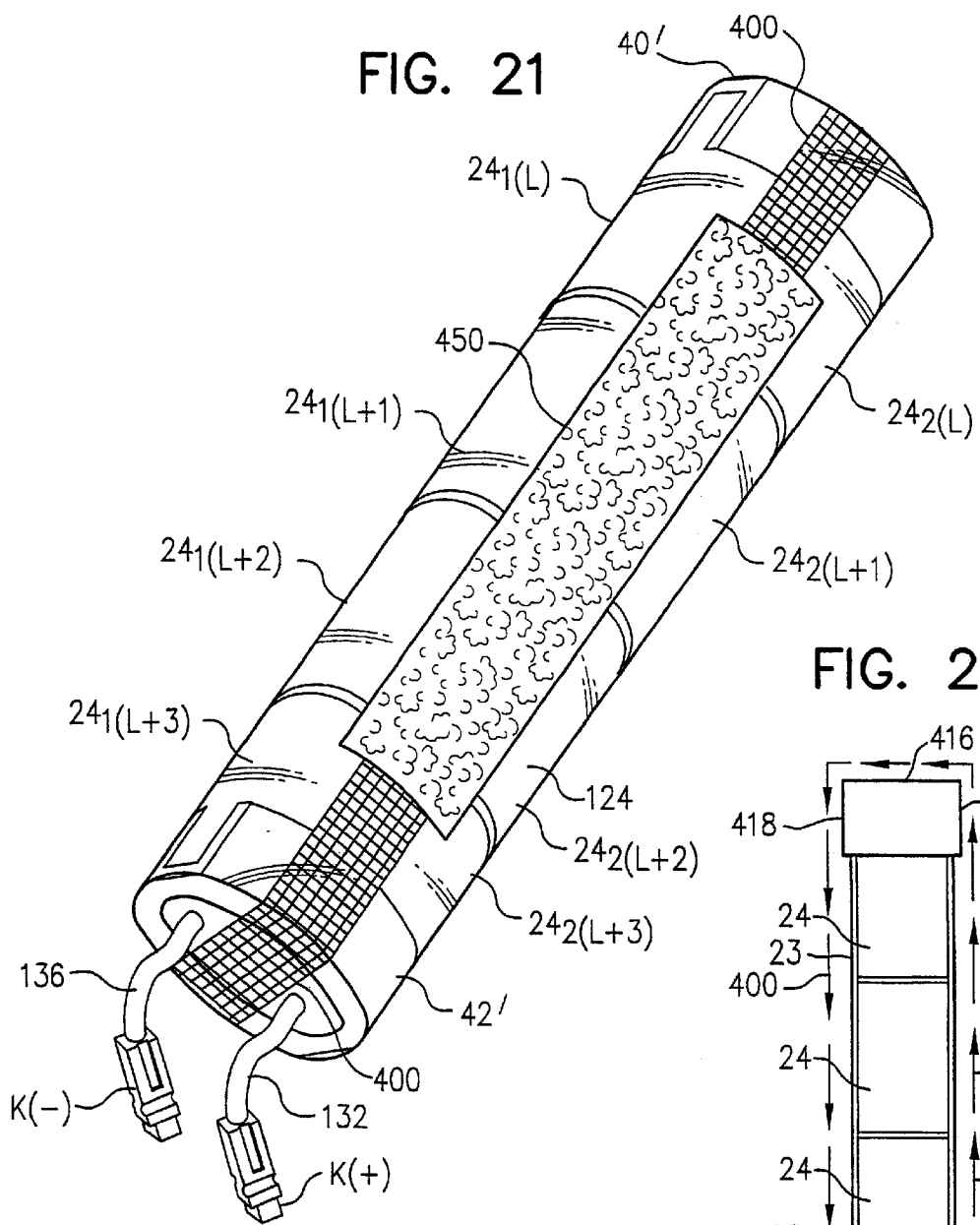
FIG. 21 is a perspective view a fully assembled battery pack, showing the use of strapping tape for tightly binding the battery pack, the use of a pair of inner shrink wrap cell holder sleeves, an outer shrink wrap layer, and the use of a hook and loop type fastener material for affixing the battery pack to a desired location in an machine which utilizes the battery pack.

A fully assembled battery pack 201', the components of which have just been described, is illustrated in FIGS. 14, where a vertical end view is provided of a pack 200 with five battery cells in a column $C_2$. In FIG. 21 a perspective view is provided of a battery pack 20" with four battery cells in each of columns $C_1$ and $C_2$. In both FIG. 14 and FIG. 21, strapping tape 400 is seen through a transparent outer shrink wrap cover 124. Also, in FIG. 21, the use of a hook and loop type fastener 450, adhesively applied to the outer shrink wrap cover 124, is seen, for use with a complementary hook and loop fastener in the device utilizing my battery pack design.

Details of two embodiments of my end caps can be further understood by comparison of FIGS. 16, 19, and 20. In FIG. 16, a reflected plan view of the interior of a one embodiment of my end cap is provided; this embodiment may be utilized for either a top end cap 40 or for a bottom end cap 40, by inserting appropriate electrical connectors. Likewise the end cap shown in FIGS. 19 and 20 can be utilized as either a top end cap 42' or a bottom end cap 40', by attachment of appropriate electrical connectors as described herein. The perspective view provided in FIG. 19 illustrates the flush type end cap, 40' or 42', as is also shown in FIGS. 10, 11, 12, 13, 14, 20, 21, and 23. In addition to first 408 and second 412 outer sidewalls, a gap G defined by edgewalls 460 and 462 is provided for clearance of a selected battery 24, which is placed on selected electrical contactors provided inside the base 464. Ideally, outer sidewalls 460 and 462 extend for about a third of the height $24_H$ of an anticipated battery 24 size, although the exact height of such sidewalls is not normally critical.

For repair purposes, I find it advantageous to provide a repair kit, including a first cell holder sleeve 22, a second cell holder sleeve 23, an outer shrink wrap cover 124, and a length of tape 400, so that the user can take my battery pack apart and replace battery cells as desired, yet utilize all component parts as originally provided. Also, a decal as indicated in FIG. 26 is normally provided in my repair kit, to assist the user in assuring that correct battery polarity is observed. This repair kit and the technique of using the kit for troubleshooting and battery replacement is especially useful in model racing activities.

It is to be appreciated that the novel battery pack provided by the present invention is a significant improvement in the state of the art of battery packs, especially for battery packs used for model aircraft and autos. My novel battery pack, and the method of employing the same in operation of model aircraft and the like, is relatively simple, and it substantially improves the cost effectiveness of the battery operations in apparatus which utilize the same. It will be readily apparent to the reader that my novel, battery pack device and the method of using the same may be easily adapted to other embodiments incorporating the concepts taught herein. Thus, the invention may be embodied in other specific forms without departing from the spirit or essential characteristics thereof. Therefore, the embodiments presented herein are to be considered in all respects as illustrative and not restrictive. All changes and devices which are described within the meaning and range of equivalents of the disclosures set forth herein are therefore intended to be embraced therein.

What is claimed is:

1. An end cap for a battery pack for securing one or more battery cells therein, said end cap comprising:
   (a) a base, said base having an interior end wall portion;
   (b) said base further comprising a first flange, said first flange having an exterior wall, and interior wall portion, and a first and second edgewalls at opposing ends of said first flange;
   (c) said base further comprising a second flange, said second flange having an exterior wall, an interior wall portion, and third and fourth edgewalls at opposing ends of said second flange;
   (d) said first and said third edgewalls cooperating to define therebetween an opening, wherein said opening is sized and shaped to accommodate a portion of a battery cell in close fitting relationship between said first and said third edgewalls;
   (e) said second and said fourth edgewalls cooperating to define therebetween an opening, wherein said opening is sized and shaped to accommodate a portion of a battery cell in close fitting relationship between said second and said fourth edgewalls;
   (f) a first throughwall portion defining a first through-hole through said base;
   (g) a second throughwall portion defining a second through-hole through said base.

2. The end cap as set forth in claim 1, wherein said end cap has an external surface portion, said external surface portion having a smooth external shape, so that a battery pack assembled utilizing said end cap has a flush, smooth external shape, and accommodates said end cap without extra width in the battery pack.

3. The end cap as set forth in claim 1, further comprising:
   a positive electrical lead and a negative electrical lead, said first and said second through holes each sized and shaped to each accommodate one of said positive and said negative electrical leads therethrough.

4. The end cap as set forth in claim 1, further comprising
   (a) a connector bar, said connector bar having a land portion, and
   (b) in said base and located between said first flange and said second flange, a connector bar receiving indentation, said connector bar receiving indentation protruding outwardly from said interior end wall portion, said connector bar receiving indentation sized and shaped to accept therein said land portion of said connector bar.

5. The end cap as set forth in claim 4, wherein said land portion of said connector bar fits in close mating engagement with said connector bar receiving indentation.

6. The end cap as set forth in claim 5, wherein said land portion of said connector bar is sized and shaped complementary to said connector bar receiving indentation for secure engagement therewith.

7. The end cap as set forth in claim 6, wherein said connector bar comprises a thin conductive metal strip.

8. The end cap as set forth in claim 7, wherein said connector bar is about 1/32 of an inch thick.

9. An end cap for use in fabricating a battery pack, said end cap comprising:
   (a) a base, said base having an interior end wall portion;
   (b) said base further comprising a first, generally C-shaped flange, said first flange having an exterior wall, and interior wall portion, and a first and second edgewalls at opposing ends of said first flange;
   (c) said base further comprising a second, generally C-shaped flange, said second if lange having an exterior wall, an interior wall portion, and third and fourth edgewalls at opposing ends of said second flange;
   (d) said first and said third edgewalls cooperating to define therebetween an opening, wherein said opening is sized and shaped to accommodate a portion of a battery cell in close fitting relationship between said first and said third edgewalls;
   (e) said second and said fourth edgewalls cooperating to define therebetween an opening, wherein said opening is sized and shaped to accommodate a portion of a battery cell in close fitting relationship between said second and said fourth edgewalls;
   (f) a first throughwall portion defining a first through-hole through said base;
   (g) a second throughwall portion defining a second through-hole through said base.

10. An end cap for use in fabricating a battery pack, said end cap comprising:
    (a) a base, said base having an interior end wall portion;
    (b) said base further comprising a first, generally C-shaped flange, said first flange having an exterior wall, and interior wall portion, and a first and second edgewalls at opposing ends of said first flange;
    (c) said base further comprising a second, generally C-shaped flange, said second flange having an exterior wall, an interior wall portion, and third and fourth edgewalls at opposing ends of said second flange;
    (d) said first and said third edgewalls cooperating to define therebetween a generally U-shaped opening having said interior end portion defining the bottom of the U, wherein said U-shaped opening is sized, and shaped to accommodate a portion of a battery cell in close fitting relationship;
    (e) said second and said fourth edgewalls cooperating to define therebetween a generally U-shaped opening having said interior end portion defining the bottom of the U, wherein said U-shaped opening is sized and shaped to accommodate a portion of a battery cell in close fitting relationship;
    (f) so that the battery pack has a flush, smooth external shape, without extra width required for said top or said bottom end caps;
    (g) a first throughwall portion defining a first through-hole through said base;
    (h) a second throughwall portion defining a second through-hole through said base.

11. An end cap for use in fabricating a battery pack to hold one or more battery cells therein, said end cap comprising:
    (a) a base, said base having an interior end wall portion;
    (b) said base further comprising a first flange, said first flange having an exterior wall, and interior wall portion, and a first and second edgewalls at opposing ends of said first flange;
    (c) said base further comprising a second flange, said second flange having an exterior wall, an interior wall portion, and third and fourth edgewalls at opposing ends of said second flange;
    (d) said first and said third edgewalls cooperating to define therebetween a generally U-shaped opening having said interior end portion defining the bottom of the U, wherein said U-shaped opening is sized and shaped to accommodate a portion of a battery cell in close fitting relationship;
    (e) said second and said fourth edgewalls cooperating to define therebetween a generally U-shaped opening having said interior end portion defining the bottom of the U, wherein said U-shaped opening is sized and shaped to accommodate a portion of a battery cell in close fitting relationship;
    (f) a first throughwall portion defining a first through-hole through said base;
    (g) a second throughwall portion defining a second through-hole through said base.

12. A battery pack for holding a plurality of battery cells, each of said battery cells of the shape having an elongate body portion with an outer surface portion and opposing first and second ends, each of said first and second ends further comprising either a positive electrical terminal or a negative electrical terminal, said battery pack comprising:
    (a) a bottom end cap, said bottom end cap end comprising:
       (i) a base, said base having an interior end portion;
       (ii) a first flange, said first flange having an exterior wall, and interior wall portion, and a first and second edgewalls at opposing ends of said first flange;
       (iii) a second flange, said second flange having an exterior wall, an interior wall portion, and third and fourth edgewalls at opposing ends of said second flange;
       (iv) said first and said third edgewalls cooperating to define therebetween an opening sized and shaped to accommodate therebetween a portion of a battery cell in close fitting relationship;
       (v) said second and said fourth edgewalls cooperating to define therebetween an opening sized and shaped to accommodate therebetween a portion of a battery cell in close fitting relationship;
       (vi) a first electrical contact, said first electrical contact adapted to provide electrical continuity with a lower end of a lowermost of said plurality of battery cells;
       (vii) said bottom end cap shaped to fit along a portion of said outer surface portion of at least one of said plurality of battery cells, so as to receive therein in snug fitting fashion, transverse cross-sectionwise, at least some of said outer surface of said elongate body portion of said at least one of said plurality of battery cells, (b) a top end cap, said top end cap comprising
 (i) a base, said base having an interior end portion;
 (ii) a third flange, said third flange having an exterior wall, and interior wall portion, and a fifth and sixth edgewalls at opposing ends of said third flange;
 (iii) a fourth flange, said fourth flange having an exterior wall, an interior wall portion, and seventh and eighth edgewalls at opposing ends of said fourth flange;
 (iv) said fifth and said seventh edgewalls cooperating to define therebetween an opening sized and shaped to accommodate therebetween a portion of a battery cell in close fitting relationship;
 (v) said sixth and said eighth edgewalls cooperating to define therebetween an opening sized and shaped to accommodate therebetween a portion of a battery cell in close fitting relationship;
 (vi) a second electrical contact, said second electrical contact adapted to provide electrical continuity with an uppermost end of an uppermost of said plurality of battery cells;
 (vii) said top end cap shaped to fit along a portion of said outer surface portion of at least one of said plurality of battery cells, so as to receive therein in snug fitting fashion, transverse cross-sectionwise, at least some of said outer surface of said elongate body portion of said at least one of said plurality of battery cells, (c) an outer surface cover, said outer surface cover comprising a shrink wrap material, said shrink wrap material sized and shaped, when fully treated to its final shrunk size and shape, to compressingly engage and urge said top end cap and said bottom end cap toward each other, so as to compressingly engage battery cells spaced between said top end cap and said bottom end cap.

13. The battery pack as set forth in claim 12, wherein said battery cells are provided in a first column and a second column, and wherein the number of batteries is the same in each column.

14. The battery pack as set forth in claim 12, wherein said a first cell holder sleeve body, or said second cell holder sleeve body, comprises a see-through shrink wrap material.

15. The battery pack as set forth in claim 12, wherein said outer surface cover comprises a see-through shrink wrap material.

16. The battery pack as set forth in claim 12, further comprising a compression tape portion, said compression tape portion loop extending longitudinally along a front and along a back of said battery pack, over said top end cap, and below said bottom end cap, so as to compressingly confine and secure said batteries between said top end cap and said bottom end cap.

17. The battery pack as set forth in claim 16, wherein said compression tape portion comprises strapping tape.

18. The battery pack as set forth in claim 17, wherein said compression tape portion comprises a continuous tape portion extending from inside said bottom end cap, around the front of said bottom end cap, below the bottom of said bottom end cap, up the rear of said bottom end cap, longitudinally along the rear of said battery pack, along the rear of said top end cap, above the top of said top end cap, down the front of said top end cap, down the front of said battery pack, down the front of said bottom end cap over the tape portion already provided, across the bottom of said bottom end cap over the tape portion already provided, and up the rear of said bottom end cap over the tape portion already provided.

* * * * *